United States Patent [19]

Howard

[11] 4,237,118

[45] Dec. 2, 1980

[54] DIETARY SUPPLEMENT AND DIETARY METHODS EMPLOYING SAID SUPPLEMENT FOR THE TREATMENT OF OBESITY

[76] Inventor: Alan N. Howard, 10 Topcliffe Way, Cambridge, England

[21] Appl. No.: 686,594

[22] Filed: May 14, 1976

Related U.S. Application Data

[63] Continuation-in-part of Ser. No. 338,257, Mar. 5, 1973, Pat. No. 4,009,265.

[30] Foreign Application Priority Data

Mar. 6, 1972 [GB] United Kingdom ............... 10439/72
May 16, 1975 [GB] United Kingdom ............... 21029/75

[51] Int. Cl.³ .................... A0N 59/20; A01N 59/16; A61K 33/18
[52] U.S. Cl. ............................ 424/140; 424/145; 424/150; 424/177; 424/144
[58] Field of Search ............... 424/140, 145, 177, 150

[56] References Cited

PUBLICATIONS

"Low Carbohydrate Diet and Cookbook," by Roy Ald (1967), New York, N.Y., pp. 11-19, 174-179.
"Human Nutrition and Dietetics," 5th Ed. (1972), pp. 242-249 by Davidson et al.
Journal Amer. Med. Ass., vol. 97 (1931), pp. 1063-1068.
Journal Am. Med. Ass., vol. 181 (1931), pp. 336-349 by Strang et al.

Label from 1 container of "Slender," a dietary composition, sold by the Carnation Co.

Primary Examiner—Elbert L. Roberts
Attorney, Agent, or Firm—Alexis Barron

[57] ABSTRACT

A dietary supplement, for use with from 61.3 to 123 grams of dried skimmed milk (or the equivalent quantity of liquid skimmed milk) in the dietary regime disclosed in copending Application Serial No. 338,257 (U.S. Pat. No. 4,009,265), in which the amount of said supplement which contains a datum level of 18±9 mg iron also contains at least 182 mg sodium, at least 308 mg potassium and at least 64 mg magnesium, as well as Vitamin A in an amount of at least 750 μg retinol equivalents, at least 100 i.u. Vitamin D, at least 0.76 mg thiamine, at least 14 mg nicotinic acid (or nicotinamide), and at least 18 mg ascorbic acid, and in which the total calorie content (if any) of that amount of supplement is not greater than 200 Kcals, usually is less than 100 Kcalories, and preferably does not exceed 25 Kcalories. The supplement preferably also contains 50-150 μg iodine and/or at least 157 mg phosporus, and/or traces of copper, zinc and manganese, and/or at least 2 mg Vitamin $B_6$, at least 5 μg Vitamin $B_{12}$, at least 30 i.u. Vitamin E, at least 0.4 mg folic acid and at least 0.7 mg riboflavin. It also desirably contains trace amounts of pantothenic acid, d-biotin, p-aminoenzoic acid, choline and/or Vitamin K, as well as optionally up to 500 mg of L-methionine and/or L-cysteine and/or L-cystine, and/or from 1.0 g to 10 g of essential fatty acid(s).

30 Claims, 1 Drawing Figure

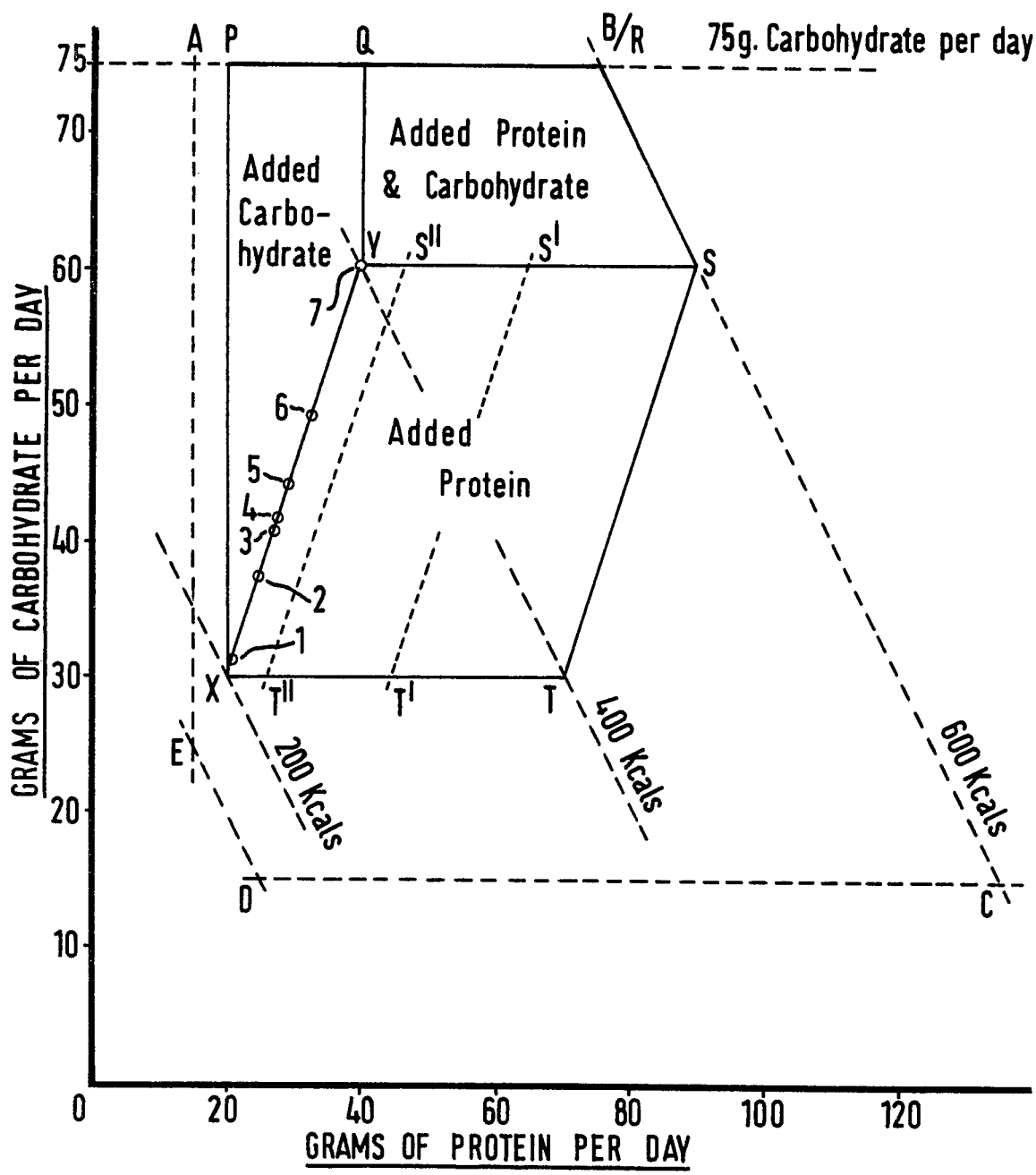

DIETARY SUPPLEMENT AND DIETARY METHODS EMPLOYING SAID SUPPLEMENT FOR THE TREATMENT OF OBESITY

This invention concerns a dietary supplement and dietary methods employing said supplement for the treatment of obesity, and is a Continuation-in-Part of my copending U.S. Pat. Application Ser. No. 338,257 (U.S. Pat. No. 4,009,265).

BACKGROUND OF THE INVENTION

In the Specification of my copending Application Ser. No. 338,257 (U.S. Pat. No. 4,009,265), there is described and claimed a method for the treatment of obesity in man, which comprises the steps of giving the overweight patient a daily diet consisting essentially of,
 (a) at least the minimum daily requirement of all the minerals required by man, including at least 800 mg calcium, 800 mg phosphorus, 140 μg iodine, 10 mg iron and 350 mg magnesium;
 (b) proteinaceous material selected from at least one member of the class consisting of:
  (i) a mixture of monomeric L-aminoacids, and
  (ii) natural proteins, and
  (iii) natural proteins reinforced with at least one monomeric L-aminoacid;
 (c) digestible carbohydrate;
 (d) at least the minimum daily requirement of all the vitamins required by man; and
 (e) sufficient fat, oil or other source of essential fatty acid to supply the patient's minimum fatty acid requirements;
said method being characterized in that the amount of proteinaceous material given daily is at least 15 g and contains at least the minimum daily requirements for man of all the essential L-aminoacids required by man, and the amount of carbohydrate given daily is from 15 g to 75 g, and that the total caloric value of the daily diet is in the range of from 160 Kcals to 600 Kcals.

In that dietary method for the treatment of obesity, which for convenience I will sometimes hereinafter call "my diet", it is advantageous to give the overweight patient a complete diet formulation which contains at least all the components (a), (b) and (c), and preferably also components (d) and (e) set out above, in the appropriate proportions, so that he can use the formulation (if necessary mixed with water) as his sole means of nutrition until the desired loss of body weight has been achieved.

Thus in the Specification of my aforesaid Application Ser. No. 338,257 there is also described and claimed a dietary formulation for the treatment of obesity in man, which comprises:
 (a) all the minerals required by man;
 (b) proteinaceous material selected from the class consisting of:
  (i) a mixture of monomeric L-aminoacids, and
  (ii) natural proteins, and
  (iii) natural proteins reinforced with at least one monomeric L-aminoacid; and
 (c) digestible carbohydrate;
characterized in that the smallest amount of the dietary formulation containing at least the minimum daily requirements of each of the minerals required by man including at least 800 mg calcium, 800 mg phosphorus, 140 μg iodine, 10 mg iron and 350 mg magnesium, also contains:
 (A) at least 15 g of said proteinaceous material which must include at least the minimum daily requirements for man of all the essential L-aminoacids required by man; and
 (B) from 15 g to 75 g of the digestible carbohydrate; and further characterized in that the total caloric value of said smallest amount of the dietary formulation is in the range of from 160 Kcals to 600 Kcals.

The dietary requirements of man and the minimum daily amounts of the various constituents of a healthy diet are of course discussed in detail in my aforesaid Application Ser. No. 338,257, the disclosure of which is incorporated herein by cross-reference. The methods and formulations there described and claimed have proved to be very effective in the treatment of obesity, and excellent results have been achieved. Unfortunately however the complete dietary formulations disclosed in my Application Ser. No. 338,257 are somewhat costly to make and to market, and tend to be rather uninteresting and often objectionable in flavour.

Attempts to overcome these drawbacks to the widespread acceptance of my diet have led me to the recognition that in general most people find milk palatable, and that even today milk still remains a relatively low-cost source of many of the essential ingredients of any diet. Milk was of course suggested as a possible source of natural protein and carbohydrate in my aforesaid Application Ser. No. 338,257 and can be used in accordance with the general direction given there for both the diet and the formulations.

Skimmed milk is preferred, since it is much lower in calorie content than whole milk, and yet contains all the other nutrients besides those present in the milk fat. For instance, it is a good source of protein and carbohydrate, sufficient to meet the requirements over a considerble range of the diet of my aforesaid Application Ser. No. 338,257. It also contains substantial amounts of calcium and phosphorus, though enough to meet requirements over only the upper part of the range within which the skimmed milk fulfills the requirements of the diet for protein and carbohydrate. Skimmed milk is however sadly deficient, to varying degrees, in other minerals required by man; and it is also inadequate or lacking in many of the vitamins and also in the essential fatty acid(s) required by man.

What therefore is needed, if skimmed milk-based diets in accordance with my aforesaid Application Ser. No. 338,257 are to be widely adopted, is a ready-formulated supplement which, when administered to the patient in conjunction with skimmed milk either in liquid or in powder form, will complement and make good the nutritional deficiencie (by which of course I mean the deficiencies in relation to the intended dietary regime) of the skimmed milk. Given some predetermined level of administration of skimmed milk to the patient, it is though complicated nevertheless quite possible to calcuate the nutritional deficiencies of that amount of skimmed milk, and thus to work out how much more of additional nutrients must also be administered to the patient.

The problem which I have set out to solve is not however as simple as that, since for practical usefulness such a supplement must not only enable the clinician to vary the severity of the diet within permissible limits but also must allow for some margin of error in the measurement of the quantities of skimmed milk (and perhaps even of the supplement) which the patient takes at any one time. Moreover, while in carefully-supervised hospital treatment it may well be practical to administer various elements of the diet separately to the patient, if he is to adhere to the diet in the uncontrolled environment of his own home it is highly desirable that the variety of different elements of the diet which must be taken should be as few as possible, and that each of them should be as palatable as possible. Nor are these the only considerations-for precise control of the amount of supplement administered at any one time it is distinctly preferable to formulate it as tablets or the like, but it is well-known that most patients display some resistance to taking either too large a tablet or too many smaller tablets.

There is currently no commercially-available formulation which contains the minerals and vitamins, far less the other necessary chemicals including essential fatty acid(s), in a form suitable for use as a supplement to skimmed milk in my diet. There are indeed some dietary formulations which contain some of the necessary minerals in the right proportions, but being designed with other aims in view they contain substantial quantities of carbohydrate and other ingredients, which raise them way above the uppermost limits of my diet, namely 75g carbohydrate and/or 600 Kcalories per day. Leaving aside all such high-calorie diets and other foodstuffs, which are ruled out for that reason, there are of course vitamin tablets on the market which in some cases also include minerals. Such vitamins-plus-minerals tablets are however intended to be used as a supplement to normal food which contains ample amounts of many of the necessary minerals, such as sodium, potassium and magnesium, and consequently the alreadyavailable tablets do not contain sufficient of these minerals to supplement my low-calorie milk-based diet.

SUMMARY OF THE INVENTION

I have however now been able to devise a supplement which meets practical requirements, in that it can be used with confidence by the clinician and without undue stress or difficulty by the patient, even unsupervised at home, in conjunction with convenient amounts of skimmed milk (either liquid or powdered) to provide a safe, low-calorie diet in accordance with my aforesaid Application Ser. No. 338,257 over the worthwhile range of calorie-intake of from about 200 Kcalories to about 600 Kcalories per day.

According to this invention there is provided a dietary supplement, containing minerals and vitamins, for use in conjunction with skimmed milk to provide a complete low-calorie diet for the treatment of obesity in man, in which the amount of said supplement which contains a datum level of 18 mg±9 mg iron also contains at least 182 mg sodium, at least 308 mg potassium and at least 64 mg magnesium, as well as vitamin A in an amount of at least 750 µg retinol-equivalents, vitamin D in an amount of at least 100 i.u. vitamin D, at least 0.76 mg thiamine, at least 14 mg nicotinic acid (or nicotinamide), and at least 18 mg ascorbic acid, and in which the total calorie content (if any) of that amount of supplement is not greater than 200 Kcals.

For purposes of definition it will be noted that the amounts of the various ingredients of the supplement are specified, not in absolute terms but in proportion to a datum level of iron in the supplement. For convenience however the datum level for iron and the proportionate amounts of the other ingredients have all been expressed in figures which correspond to the daily intake of supplement.

Milk is almost wholly deficient in iron, and in the ranges of my invention contributes a maximum of 1 mg. Iron must be present in any human diet used for prolonged periods, but its amount must lie within narrow limits. There is some divergence of view as to the precise minimum which is required; in Britain it is generally accepted that an intake of about 10 mg per day will suffice, at least for considerble periods, whereas in the United States of America a slightly higher minimum intake of about 18 mg per day is normally prescribed. It is therefore recommended that the higher of these minima should be adopted as the datum level against which the other ingredients of the supplement are to be proportioned. Over the period of a dietary regime however it is certainly possible to go as low as the lower limit of 9 mg per supplement per day allowing for a maximum of 1 mg in the milk, while on the other hand it is also possible to go somewhat above 18 mg per day—but because iron much in excess of 18 mg per day causes digestive upsets and can give rise to toxic effects, I have set 27 mg per day as a somewhat arbitrary but reliable upper limit which ought not to be exceeded.

It will of course be appreciated that a supplement containing only the minerals and the vitamins specified above (or the other minerals and other vitamins mentioned hereinafter) will have a zero calorie content. There is thus no absolute requirement that the supplement should have any calorie content, and it is certainly preferable that the total calorie content of the supplement should be as low as possible. There are however certain optional but desirable constituents of the supplement, such as the essential fatty acid(s) mentioned hereinafter, whose presence will contribute to the calorie content of the supplement. It may also sometimes be thought desirable to incorporate other optional ingredients such as carbohydrates (or even proteins), for instance to enhance the palatability of the supplement, and these too will contribute to the calorie content of the supplement. The supplement has been designed to accommodate such optional ingredients, while still being usable in conjunction with skimmed milk within the safe and effective limits of my diet provided that care is taken to ensure that the total calorie content of the amount of supplement containing the datum level of iron does not exceed 200 Kcalories. That however is an extreme upper limit, and it is recommended to ensure normally that the total calorie content of the supplement does not exceed 100 Kcalories. It is in fact much preferred that the total calorie content of the specified amount of supplement shall not exceed 25 Kcalories.

As regards the minerals necessarily included in the diet, namely sodium, potassium and magnesium, these are all present to some extent in skimmed milk, but require to be supplemented to bring their skimmed milk-levels up to human needs. As will be explained hereinafter, the supplement of this invention is capable of use in conjunction with a range of daily intakes of skimmed milk but is especially designed to be used within a range of from (a) 123g/day dried skimmed milk (equivalent to 400 Kcals), the so-called "maximum skimmed milk intake", down to (b) 61.3g dried skimmed milk (equivalent to 200 Kcals), the so-called "minimum skimmed milk intake." These designed limits are chosen because (a) represents the optimum quantity of reconstituted milk which a patient could reasonably be expected to consume, the 400 Kcals it contains are not excessive, and the size of supplement is reasonable in volume; while (b) represents approximately the minimum quantity of skimmed milk which is needed to supply the daily requirement of calcium, so that below this level it would be considered necessary to supplement with additional calcium, which would raise the weight of the supplement to an excessive amount for the patient to tolerate.

The minimum amounts of sodium specified herein for the supplement, namely

Sodium [Na]≮182 mg is the daily amount needed to raise the skimmed milk-level in the designed maximum skimmed milk-intake to the lower limit acceptable in Britain of a "restricted salt regime", namely 920 mg (or 40 mequiv.)of Na$^+$, below which a patient might experience symptoms of sodium lack. It is in fact usually desirable to keep obese patients on a fairly moderate or even low level of sodium intake, so as to avoid fluid retention.

However, unless it is specially desired to operate at the highest levels of skimmed milk-intake and lowest levels of sodium intake, it will normally be best to incorporate a rather higher level of sodium, chosen as Sodium [Na]≮803 mg which is the daily amount needed to raise the skimmed milk-level in the designed maximum skimmed milk-intake to 1541 mg (67 mequiv.). That is a moderate level of sodium intake, commonly adopted in formula diets—as described for instance in my aforesaid Application Ser. No. 338,257. Moreover when the supplement contains about 803 mg sodium that is more than sufficient to raise the skimmed milk-level in the designed minimum skimmed milk-intake above the lower level acceptable in Britain of a "restricted salt regime".

As will appear hereinafter, there is no critical upper limit on the level of sodium in the supplement. However there is no point in exceeding the preferred upper limit, chosen as Sodium [Na]≯1173 mg since this is sufficient to supplement the designed minimum skimmed milk intake to 67 mequiv sodium.

The minimum amount of potassium specified herein for the supplement, namely:

Potassium [K]≮308 mg is the daily amount needed to raise the skimmed milk-level in the designed maximum skimmed milk-intake to the lower limit acceptable in Britain, and which I have found satisfactory in clinical trials, namely 1950 mg (or 50 mequiv) of K$^+$. It will however be best to incorporate a somewhat higher level of potassium, chosen as Potassium [K]≮1132 mg which is the daily amount needed to raise the skimmed milk-level in the designed minimum skimmed milk-intake to 1950 mg (or 50 mequiv), and does not carry the skimmed milk-level even in the designed maximum skimmed milk-intake past the normally-accepted upper limit for normal human potassium intake of 5850 mg (or 150 mequiv) per day.

The minimum amount of magnesium specified herein for the supplement, namely

Magnesium [Mg]≮64 mg is the daily amount needed to raise the skimmed milk-level in the designed maximum skimmed milk-intake to 200 mg, accepted in Britain as the lower limit which should maintain normal reserves in a human patient, and which I believe will be sufficient at least for the period over which most patients will adhere to my diet. In the United States of America however the Food and Nutrition Board of the National Academy of Sciences recommend a higher minimum daily intake of 350 mg, and so as to achieve that higher level it is recommended that the minimum amount of magnesium in the supplement should be raised to the preferred minimum, chosen as Magnesium [Mg]≮214 mg That amount in the supplement is preferable not only because it complies with U.S. requirements but also because it will suffice also to ensure that even with the designed minimum skimmed milk-intake the skimmed milk-level will be raised above the minimum daily amount of 200 mg regarded as acceptable in Britain. If it is desired to ensure that even with the designed minimum skimmed milk-intake the skimmed milk-level will be raised to the minimum daily amount of 350 mg recommended in the United States, then the amount of magnesium in the supplement should be raised to the preferred maximum, chosen as Magnesium [Mg]≯282 mg since there is no advantage in adding more, and since excess should be avoided not only for reasons of cost but more importantly also because of the bulk problem.

It is convenient at this point to say that there is no critical upper limit upon the amounts of any of these minerals in the supplement of this invention. Of course it is true that excessively large quantities of any of them could be toxic, but long before such levels could be reached the emetic properties and the sheer bulk of the supplement would rule it out from practical use. Thus within the limits of what is found practical to administer to the patient there is no reason why the supplement cannot contain any amounts of sodium, potassium and magnesium in excess of the various respective absolute and preferred minima specified herein. Considerations of bulk and expense will however normally hold the amounts of these minerals in the supplement closely adjacent the previously indicated preferred amounts thereof.

In principle, the sources of iron, sodium, potassium and magnesium used in the supplement can be any non-toxic ingestible compounds of these mineral elements. For sodium and potassium, their chlorides bicarbonates, sulphates, bitartrates, tartrates, citrates, gluconates, lactates, tetraborates, sorbates, saccharates, mono-, di-, or tri-basic salts of phosphoric acid, glycerophosphates and acetates are especially useful. For magnesium the same salts can be used, and also its oxide, hydroxide and carbonate. In the case of iron it is possible to use the same compounds as for magnesium, and in addition the native metal can be used in the form of reduced iron. However it is important, especially if the supplement is to be administered to the patient in the form of tablets or capsules, to keep the weight of the sodium, potassium and magnesium (which are the major minerals), as small as possible, since otherwise the number of tablets or capsules required could be larger than the patient is willing to take. Consequently the chlorides of sodium and potassium, and the oxide of hydroxide of magnesium are the preferred sources of these minerals, as these have lower molecular weights than other compounds.

Although iodine is another important mineral element in human nutrition, milk often contains sufficient for human requirements. Consequently iodine need not be present in the supplement of this invention; but if desired it can be incorporated in an amount of about 50–150 μg.

Both calcium and phosphorus are also essential mineral elements in human nutrition, but dried skimmed milk contains substantial amounts of both these minerals. The milk-levels of calcium are sufficient, without any supplementation, over the whole range of daily skimmed milk-intake for which the supplement of this invention is designed. Consequently calcium never need be present in the supplement though of course its presence therein is not excluded. The skimmed milk-levels of phosphorus are sufficient, without supplementation, over the largest and most important upper part of the range of skimmed milk-intake for which the supplement is designed, and there is therefore no absolute need for phosphorus to be present in the supplement. However its presence is of course not excluded, and in fact it is preferred that the datum amount of the supplement should contain at least 157 mg phosphorus so as to ensure that the supplement can be used effectively even at the lowest end of the range of skimmed milk-intake for which it is designed.

Milk contains traces of other mineral elements needed in trace amounts in human nutrition. There is some divergence of view as to the minimum amounts of these other mineral elements which are required, and anyway some trifling lack in such trace elements over the period for which the patient is likely to adhere to my diet will not necessarily be a serious matter. Consequently there is no need for the supplement of this invention to contain other mineral elements besides those mentioned previously herein. However their presence is not excluded, and for safety it is recommended that the supplement should preferably contain traces of copper, zinc and manganese.

As regards the vitamins, skimmed milk contains only insufficient amounts of these except riboflavin, and for practical purposes it is necessary for the supplement of this invention to contain substantial contributions towards the minimum daily requirements for human nutrition of the essential vitamins in the datum amount thereof. Although there is some disparity between the standards established in different countries, as disclosed for instance in "Human Nutrition and Dietetics", by Davidson, S. and Passmore, R., 4th Edition (1969) published by E. & S. Livingstone, Edinburgh, pages 154–157, it is generally accepted that the minimum daily requirements for a moderately active adult of the most important of the vitamins are as set out in Table 1 below:

TABLE 1

| Recommended Minimum Daily Intakes of Vitamins for Man | |
|---|---|
| | Range |
| Vitamin A | 750–1500 μg retinol-equivalents |
| Vitamin C (ascorbic acid) | 30–60 mg |
| Vitamin D | 100–400 i.u. |
| Nicotinic acid (nicotinamide or niacin) | 15–18 mg |
| Thiamine | 1.2–1.4 mg |
| -0-0-0-0-0-0- | |
| Vitamin $B_6$ | 1.0–2.0 mg |
| Vitamin $B_{12}$ | 5.0 μg |
| Vitamin E | 30 i.u. |
| Folic acid | 0.4 mg |
| Riboflavin | 1.4–1.7 mg |

In order to ensure that the datum amount of the supplement contains sufficient of the essential vitamins to raise skimmed milk levels thereof in the designed maximum skimmed milk-intake to these levels it is essential that the supplement should contain at least 750 μg retinolequivalents of Vitamin A, at least 18 mg Vitamin C (ascorbic acid), at least 100 i.u. of Vitamin D, at least 0.76 mg of thiamine and at least 14 mg nicotinic acid (or nicotinamide or niacin). These are chosen, allowing for the quantities of vitamins present in the designed maximum milk-intake, to carry the milk levels to the minimum recommended levels for moderately active adults according to the U.K. Dept. of Health and Social Security, 1969. Obviously higher amounts may be incorporated in the datum amount of supplement, to carry the milk levels to the maximum shown in Table 1 above.

In addition to the essential vitamins just mentioned it is also desirable to incorporate in the supplement the other vitamins listed in the second part of Table 1 above and others often considered desirable by nutritionists. The lack of them over the period during which a patient may be expected to adhere to my diet will not necessarily cause him much harm, and consequently their presence in the supplement is not absolutely essential. It is however distinctly preferable that the daily supplement should also contain at least 2 mg Vitamin $B_6$, at least 5 μg Vitamin $B_{12}$, at least 30 i.u. Vitamin E, at least 0.4 mg folic acid and at least 0.7 mg riboflavine. Trace amounts of pantothenic acid, d-biotin, p-amino benzoic acid, choline and vitamin K may also be incorporated.

The amounts stated above are for the pure vitamins. There are commercially available many compounds and derivatives of the vitamins which are biologically active. Examples of these are penta-erithrytol nicotinate (for nicotinic acid) α-tocopheryl ascorbate (for vitamins C and E) thiamine pyrophosphate (for thiamine). It is, of course, possible for any alternative sources of vitamins to be used in amounts which are biologically equivalent to the pure vitamin.

For most of the vitamins there is no critical upper limit upon the amount in which they can be incorporated in the supplement, but for reasons of economy they will usually be included only at about the necessary minima specified above, or perhaps—so as to allow for losses in storage—at slightly in excess of those minima. Although any competent nutritionist will be already aware of this, it should however be mentioned that Vitamin D exhibits toxicity if administered at much in excess of the necessary minimum amount, and as a somewhat arbitrary but safe upper limit it is therefore strongly recommended that Vitamin D should not be incorporated in the datum amount of the supplement to an extent greater than 800 mg.

Also vitamin A in excessive amounts is toxic and it is considered that an amount in the supplement greater than 6,000 μg retinol equivalents would be injurious.

Milk supplies virtually all the protein (by which I mean natural protein and/or L-aminoacids) required by my diet. It is however slightly deficient in the sulphur-containing L-aminoacids, and so as to ensure that there is no deficiency of these at the lowermost levels of skimmed milk-intake the supplement of this invention may desirably incorporate up to 500 mg of one or a mixture of more than one of the following, namely L-methionine and/or L-cysteine and/or L-cystine.

It is not necessary that the supplement of this invention should contain any other ingredients. As appears hereinafter, it is possible within limits to incorporate carbohydrate and/or proteinaceous material in the supplement. However added protein in a readily-assimilable form tends to be expensive and serves no useful purpose, except in the case of the sulphur-containing L-aminoacids which may be needed to a very limited extent in certain circumstances as discussed above. The incorporation of limited amounts of carbohydrate may be desirable, particularly for flavouring purposes or to provide sweetness. Examples of readily-assimilable carbohydrates suitable for that purpose are glucose, glucose-lactone, fructose, lactose, sucrose, maltose, edible starch, dextrin or oligo-saccharide. There are however quantitative limits upon the amounts of protein and/or carbohydrate which can be incorporated in the supplement, and these will be discussed subsequently.

Besides the dietetically-active ingredients discussed elsewhere, the supplement of this invention may incorporate ingredients which facilitate its presentation in some appropriate form to the patient. The supplement can in fact be administered in any appropriate so-to-speak "pharmaceutical" form, thus as tablets, capsules, powders, suspensions, emulsions and elixirs, etc., depending on the quantity to be ingested and patient preference. One convenient form is a powder which is mixed with skimmed milk or with reconstituted skimmed milk and flavoured to make a palatable hot or cold drink. With such modes of presentation in mind, the supplement of this invention may contain a bulking component, for example cellulose or methyl cellulose, pectin, vegetable fibre or ispaghula husk—or a gum such as acacia gum, tragacanth gum, guar gum or xanthan gum. The amount of any such bulking components will usually be small, say less than 10% by weight of the supplement, but can in some cases amount to 50% or even more. The supplement may also contain an emulsifier of the kind recommended for use in food-stuffs, for example polyoxyethylene sorbitan mono-oleate; and can also incorporate flavouring agents to increase palatability. Care should be taken to ensure that any such additional ingredients do not contribute an excessive calorie-content to the supplement; but in the quantities in which they are likely to be employed their calorie-contribution to the supplement will usually be very small.

There is however one other necessary ingredient of human diet in which skimmed milk is deficient but which has not above been specified as a necessary or even desirable ingredient of the supplement of this invention. Man requires certain amounts of fat, oil or other sources of essential fatty acid(s). Unfortunately the sources of essential fatty acids which can be used are liable to go rancid, and for that reason there is a divergence of view as to whether these can usefully be incorporated with other ingredients in dietary formulations or whether they are better administered to the patient separately, for example in the form of capsules, and they are therefore not an essential ingredient of the supplement of this invention.

However in my own view the advantage of incorporating such essential fatty acids in the supplement, and thereby reducing the number of different elements which must be administered to the patient at any one time, outweigh the possible disadvantages thereof—especially since the risk of rancidity is much reduced if the essential fatty acids are incorporated in the supplement together with suitable anti-oxidants such as for example α-tocopherol or butyrated hydroxy toluene (BHT).

It is thus a preferred feature of this invention that the datum quantity of the supplement should also incorporate at least 1.0 g of essential fatty acid. While there is no critical upper limit on the amount of essential fatty acids incorporated, considerations of economy and palatability make it desirable to avoid incorporation of more than about 10 g of essential fatty acids.

The preferred fats/oils are highly-unsaturated vegetable oils especially those having a high content (>25%) of linoleic acid, such as for example safflower seed oil or ethyl linoleate and esters of linoleic acid (especially the methyl and ethyl esters thereof). The formulation therefore will normally contain at least 1% by weight and not more than 67% by weight of safflower oil or equivalent.

As previously indicated, the supplement of this invention is designed for use in conjuction with skimmed milk (in either liquid or dry powdered form) to provide a skimmed milk-based diet, as can most easily be seen by reference to the accompanying drawings.

In FIG. 1 the area A, B, C, D, E represents the daily limits of my diet as disclosed and claimed in the aforesaid Application Ser. No. 338,257. The heavy line X-Y represents the balance of carbohydrate to protein in the amounts of skimmed milk for use with which the supplement of this invention is designed. The area X, P, Q, Y above the line X-Y represents the amount of carbohydrate alone (i.e. without protein) which may be incorporated in the supplement of this invention without exceeding the 75 g per day upper limit upon carbohydrate-intake imposed by my diet. The area X, Y, S, T to the right of the line X-Y represents the amount of protein along (i.e. without carbohydrate) which may be incorporated in the supplement of this invention without exceeding the limitation (line S-T) that its calorie-content must not be greater than 200 Kcalories, usually will not be greater than 100 Kcalories (line S'-T') and preferably will not be greater than 25 Kcalories (line S"-T").

The area Y, Q, R, S, above and to the right of point Y, represents the diet which can be achieved only by adding both carbohydrate and protein to the supplement.

Accordingly, if the supplement of this invention contains carbohydrate and/or protein, the resepective and combined amounts thereof must lie within the limits defined by the area X, P, R, S, T in the accompanying drawings.

Since as previously indicated there is little or no advantage in adding protein to the supplement, but its cost tends to be significantly increased thereby, for most practical purposes the supplement will contain only added carbohydrate (i.e. no added protein, and the amount thereof will lie within the limits defined by the area X, P, Q, Y in the accompanying drawing.

The invention also extends to a method for the treatment of obesity in man, which comprises the steps of giving the overweight patient a daily diet of from 61.3 to 123 grams of dried skimmed milk (or the equivalent quantity of liquid skimmed milk) together with a supplement as herein defined, as well as sufficient fat, oil or other source of essential fatty acids to supply the patient with the minimum fatty acid requirements.

DESCRIPTION OF THE PREFERRED EMBODIMENTS

In order that the invention may be well understood the following Examples will now be given, though only by way of illustration, to show preferred compositions of the supplement, and their use in conjunction with various daily amounts of skimmed milk in my diet, as follows:

EXAMPLE 1—UNFLAVOURED POWDERED SUPPLEMENT

The supplement was prepared by intimately mixing together the following ingredients:

| | |
|---|---|
| tri-sodium citrate, 2H$_2$O | 40.5 g |
| tri-potassium citrate, H$_2$O | 17.6 g |
| magnesium gluconate | 44.8 g |
| potassium iodide | 1.84 mg |
| manganous acetate, H$_2$O | 143 mg |
| cupric acetate, H$_2$O | 70 mg |
| ferrous ammonium sulphate, 6H$_2$O | 1.28 g |
| zinc acetate, 2H$_2$O | 15 mg |
| safflower oil | 50 ml |
| emulsifier, polyoxethylene sorbitan mono oleate | 3.1 g |
| ascorbic acid | 600 mg |
| folic acid | 4 mg |
| nicotinamide | 180 mg |
| riboflavin | 17 mg |
| thiamin | 14 mg |
| vitamin A (retinol) | 15 mg |
| vitamin B$_6$ | 20 mg |
| vitamin B$_{12}$ | 50 µg |
| vitamin D | 4,000 i.u. |
| vitamin E | 300 i.u. |
| d-calcium pantothenate | 200 mg |
| d-Biotin | 2.6 mg |
| p-amino benzoic acid | 4.16 g |
| choline bitartrate | 2.23 g |
| menadione (vit. K) | 602. mg |

The supplement thus prepared may be mixed with 10,000 grams of dried skimmed milk to provide a complete diet.

A typical daily does of that complete diet is 120 g, distributed as three meals of 40 g mixture including the dried skimmed milk mixed with 0.5 liter water before use.

In the above Example, the sodium citrate can be reduced to 24.4 g and the magnesium gluconate to 25.6 g if a diet lower in sodium and magnesium is required for use in a low salt regime.

EXAMPLE 2—CHOCOLATE-FLAVOURED POWDERED SUPPLEMENT

The supplement was prepared by intimately mixing together the following ingredients:

| | |
|---|---|
| tri-sodium citrate, 2H$_2$O | 81 g |
| tri-potassium citrate, H$_2$O | 35.2 g |
| magnesium gluconate | 89.6 g |
| potassium iodide | 3.68 mg |
| manganous acetate, H$_2$O | 286 mg |
| cupric acetate, H$_2$O | 152 mg |
| ferrous ammonium sulphate, 6H$_2$O | 1.40 g |
| zinc acetate, 2H$_2$O | 30 mg |
| corn oil | 120 ml |
| polyoxyethylene sorbitan mono oleate | 6.0 g |
| ascorbic acid | 1.20 g |
| folic acid | 8 mg |
| nicotinamide | 360 mg |
| riboflavine | 20 mg |
| thiamine | 28 mg |
| vitamin A (retinol) | 15 mg |
| vitamin D | 2,000 i.u. |
| vitamin B$_6$ | 40 mg |
| vitamin B$_{12}$ | 100 µg |
| vitamin E | 500 i.u. |
| d-calcium pantothenate | 400 mg |
| d-biotin | 5 mg |
| p-amino benzoic acid | 8 g |
| choline bitartrate | 5 g |
| menadione (vit. K) | 1.2 g |
| Low calorie chocolate flavouring to make | 250 g |

When 4.2 g of the powdered supplement thus prepared is added to 30 g dried milk, and the mixture reconstituted with ½ pint hot water, a palatable drink is made which gives adequate nutrition to the obese patient when consumed thrice daily.

EXAMPLE 3—SUPPLEMENT (WITHOUT METHIONINE) IN THE FORM OF CAPSULES

A powdered mineral-and-vitamin supplement was prepared by intimately mixing together the following ingredients:

| | |
|---|---|
| Iron (reduced) | 9 g |
| sodium chloride | 256 g |
| potassium chloride | 187 g |
| magnesium oxide | 62 g |
| pectin | 250 g |
| a commercially-available multi-vitamin mixture (containing 225 mg retinol, 30,000 i.u. Vitamine D, 24C mg thiamine, 45 g nicotinamide, 60g ascorbic acid) to make 900 g | |

This mixture was filled into hard gelatin capsules, each containing 0.5 g mixture. Two capsules are consumed three times daily. This, when taken with 120 g per day skimmed milk and one teaspoon corn oil supplies complete daily nutrition for an overweight patient.

In the above Example, the sodium chloride can be reduced to 150 g and the pectin omitted. The patient would require only three capsules for complete daily use (each containing 0.55 g) in addition to the other above mentioned food ingredients. The above mineral mixtures could also be converted into tablets by mixing with small quantities of calcium stearate and talc and tabletting in the usual manner.

EXAMPLE 4—SUPPLEMENT (WITH METHIONINE) IN THE FORM OF TABLETS

A powdered mineral-and-vitamin supplement was prepared by intimately mixing together the following ingredients:

| | |
|---|---|
| sodium chloride | 138 g |
| ferrous ammonium sulphate, 6H$_2$O | 10 g |
| potassium chloride | 212 g |
| magnesium hydroxide | 22 g |
| L-methionine | 25 g |
| calcium stearate | 15 g |
| a commercially-available multi-vitamin (containing 3.0 g Vitamine C, 1.5 g nicotinic acid, 10,000 i.u. Vitamin D, 75 mg retinol, 120 mg thiamine) | up to 500 g |

After these ingredients have been mixed, they are tabletted. Three tablets of 560 mg each are given thrice daily, together with ⅝ pint skimmed milk daily, one teaspoon of corn oil and a small apple.

EXAMPLE 5—SUPPLEMENT (INCLUDING ESSENTIAL FATTY ACIDS) IN THE FORM OF CAPSULES

A powdered supplement was prepared by intimately mixing together the following ingredients:

| | |
|---|---|
| sodium chloride | 256 g |
| potassium chloride | 187 g |
| magnesium oxide | 58 g |
| guar gum | 95 g |
| potassium iodide | 18.4 mg |
| manganous acetate, H$_2$O | 1.43 mg |
| cupric acetate, H$_2$O | 700 mg |
| ferrous ammonium sulphate,6H$_2$O | 7 g |
| zinc acetate, 2H$_2$O | 150 mg |
| ascorbic acid | 6.0 g |
| folic acid | 40 mg |
| nicotinamide | 1.8 g |
| riboflavine | 100 mg |
| thiamine | 140 mg |
| vitamin A (retinol) | 75 mg |
| vitamin B$_6$ | 200 mg |
| vitamin B$_{12}$ | 500 μg |
| vitamin D | 20,000 i.u. |
| vitamin E | 3,000 i.u. |
| d-calcium pantothenate | 2.0 g |
| d-Biotin | 26 mg |
| p-amino benzoic acid | 41.6 g |
| choline bitartrate | 22.3 g |
| menadione (vit. K) | 6.0 g |
| ethyl linoleate | 300 g |

The above mixture is made up to 1000 g with talc and filled into hard gelatin capsules (each of 500 mg weight). Five capsules four times daily with one liter of skimmed milk gives adequate nutrition for the obese patient who wishes to lose weight.

EXAMPLES 6–11—USE OF VARIOUS SUPPLEMENTS WITH SKIMMED MILK

To illustrate the various amounts of minerals and vitamins required to supplement a range of useful amounts of skimmed milk seven different supplement formulations are given below which correspond to the points marked 1–7 on the line X-Y in FIG. 1 of the drawings.

TABLE 2
The use of different quantities of skimmed milk in conjunction with seven different supplements

| | | Supplement for use with the amount of Skimmed Milk identified in FIG. 1 of the drawings as: | | | | | | |
|---|---|---|---|---|---|---|---|---|
| | | 1. | 2. | 3. | 4. | 5. | 6. | 7. |
| Amount of Skimmed Milk | | | | | | | | |
| Kcal. | | 206 | 248 | 272 | 277 | 293 | 326 | 400 |
| Wt., g | | 63.2 | 76.2 | 83.4 | 85.0 | 90.0 | 100 | 123 |
| Wt., oz | | 2.2 | 2.7 | 2.9 | 3.0 | 3.2 | 3.5 | 4.33 |
| Volume, L | | 0.65 | 0.78 | 0.85 | 0.87 | 0.92 | 1.02 | 1.34 |
| Volume, pints | | 1.13 | 1.37 | 1.50 | 1.53 | 1.62 | 1.80 | 2.35 |
| Composition of Skimmed Milk | | | | | | | | |
| Carbohydrate | | 31.0 | 37.4 | 40.9 | 41.7 | 44.1 | 49.1 | 60.4 |
| Protein | | 21.8 | 26.2 | 28.8 | 29.3 | 31.0 | 34.5 | 42.4 |
| Calcium | | 0.80 | 0.96 | 1.06 | 1.08 | 1.14 | 1.26 | 1.55 |
| Phosphorus | | 0.66 | 0.80 | 0.88 | 0.89 | 0.95 | 1.05 | 1.23 |
| Iron | | 0.32 | 0.39 | 0.43 | 0.44 | 0.46 | 0.52 | 0.64 |
| Vitamin D i.u. | | tr | tr | tr | tr | tr | tr | tr |
| Vitamin A u.g. retinol | | tr | tr | tr | tr | tr | tr | tr |
| Vitamin C mg | | 6.3 | 7.6 | 8.3 | 8.5 | 9.0 | 10.0 | 12.3 |
| Thamine mg | | 0.22 | 0.27 | 0.30 | 0.30 | 0.32 | 0.36 | 0.44 |
| Nicotinic Acid mg | | 0.50 | 0.60 | 0.66 | 0.68 | 0.72 | 0.80 | 0.98 |
| Riboflavin | | 1.01 | 1.21 | 1.33 | 1.36 | 1.44 | 1.60 | 1.96 |
| Minerals in Supplement, mg | MDA* | | | | | | | |
| Sodium, mg | 67 mequiv. | 1170 | 1090 | 1050 | 1040 | 1010 | 950 | 805 |
| | 40 mequiv | 540 | 460 | 420 | 410 | 380 | 320 | 182 |
| Potassium, mg | 50 mequiv. | 1110 | 940 | 840 | 816 | 749 | 615 | 308 |
| Magnesium, mg | 350 mg | 280 | 266 | 258 | 256 | 250 | 240 | 214 |
| | 200 mg | 131 | 116 | 109 | 107 | 101 | 90 | 64 |
| Calcium, mg | 800 mg | — | — | — | — | — | — | — |
| Phosphorous, mg | 800 mg | 136 | — | — | — | — | — | — |
| Iron, mg | 10 mg | 9.7 | 9.6 | 9.6 | 9.6 | 9.6 | 9.5 | 9.4 |
| Vitamins in supplement | MDA | | | | | | | |
| Vitamin D i.u. | 100 i.u. | 100 | 100 | 100 | 100 | 100 | 100 | 100 |
| Vitamin A (retinol equiv.) μg | 750 μg | 750 | 750 | 750 | 750 | 750 | 750 | 750 |
| Vitamin C, mg | 30 mg | 23.7 | 22.4 | 21.7 | 21.5 | 21.0 | 20.0 | 17.7 |
| Thiamine, mg | 1.2 mg | 0.98 | 0.93 | 0.90 | 0.90 | 0.88 | 0.84 | 0.76 |

TABLE 2-continued

The use of different quantities of skimmed milk in conjunction with seven different supplements

| | | Supplement for use with the amount of Skimmed Milk identified in FIG. 1 of the drawings as: | | | | | | |
|---|---|---|---|---|---|---|---|---|
| | | 1. | 2. | 3. | 4. | 5. | 6. | 7. |
| Nicotinic acid, mg | 15 mg | 14.5 | 14.4 | 14.4 | 14.4 | 14.3 | 14.2 | 14.0 |
| Riboflavine, mg | 1.4 mg | 0.39 | 0.19 | 0.07 | 0.04 | — | — | — |

*Minimum Daily Amount

I claim:

1. A dietary supplement, containing minerals and vitamins, for use in a conjunction with skimmed milk to provide a complete low-calorie diet for the treatment of obesity in man, in which the amount of said supplement which contains a datum level of 18 mg ±9 mg iron also contains at least 182 mg sodium, at least 308 mg potassium and at least 64 mg magnesium, as well as vitamin A in an amount of at least 750 μg retinol equivalents, at least 100 i.u. Vitamin D, at least 0.76 mg thiamine, at least 14 mg nicotinic acid and at least 18 mg ascorbic acid, and in which the total calorie content (if any) of that amount of supplement is not greater than 200 Kcals.

2. A supplement as claimed in claim 1, in which the total calorie content of the datum amount of supplement containing the datum level does not exceed 100 Kcalories.

3. A supplement as claimed in claim 1, in which the datum amount of supplement contains from 803 mg to 1173 mg of sodium and at least 1132 mg of potassium.

4. A supplement as claimed in claim 1, in which the datum amount contains from 214 mg to 282 mg of magnesium.

5. A supplement as claimed in claim 1, in which the datum amount of supplement also includes iodine in an amount of at least 50 μg.

6. A supplement as claimed in claim 1, in which the datum amount thereof also includes at least 157 mg phoshorus.

7. A supplement as claimed in claim 1, which also contains traces of copper, zinc and manganese.

8. A supplement as claimed in claim 1, in which the amounts (if any) of carbohydrate and protein incorporated in the datum amount of supplement lie within the area X, P, R, S, T shown in the accompanying drawings.

9. A dietary supplement, containing minerals and vitamins, for use in a conjunction with skimmed milk to provide a complete low calorie diet for the treatment of obesity in man, in which a datum amount thereof containing about 18 mg iron also contains from 803 mg to 1173 mg sodium, at least 1132 mg potassium, from 214 to 282 mg magnesium and at least 157 mg phosphorus, as well as Vitamin A in an amount of at least 750 μg retinol equivalents, at least 100 i.u. Vitamin D, at least 0.76 mg thiamine, at least 14 mg nicotinic acid and at least 18 mg ascorbic acid, and in which the calorie content of said datum amount of supplement is up to 25 Kcalories.

10. A supplement according to claim 9, in which the datum amount thereof also includes iodine in an amount of 50-150 μg.

11. A supplement as claimed in claim 9, in which the datum amount thereof also includes at least 2 mg Vitamin B$_6$, at least 5 μg Vitamin B$_{12}$, at least 30 i.u. Vitamin E, at least 0.4 mg folic acid and at least 0.7 mg riboflavin.

12. A supplement as claimed in claim 9, in which the datum amount thereof also includes trace amounts of vitamins selected from the group consisting of pantothenic acid, d-biotin, p-aminobenzoic acid, choline and Vitamin K.

13. A supplement as claimed in claim 9, in which the datum amount thereof also incorporates up to 500 mg of a a sulfur-containing L-aminoacid selected from the group consisting of L-methionine, L-cysteine, L-cystine and mixtures thereof.

14. A supplement as claimed in claim 9, in which the datum amount thereof also incorporates from 1.0 g to 10 g of essential fatty acids.

15. A supplement as claimed in claim 14, in which the source of essential fatty acids includes a highly unsaturated vegetable oil having a content of more than 25% of linoleic acid.

16. A supplement as claimed in claim 9, which contains carbohydrate (without added protein) in an amount lying within the limits defined by the area X, P, Q, Y shown in the accompanying drawings.

17. A method for the treatment of obesity in man, which comprises the steps of giving the overweight patient a daily diet consisting essentially of skimmed milk and a supplement according to claim 1 in an amount equivalent to 18 mg ±9 mg of iron, said skimmed milk being given in an amount equivalent to from 61.3 to 123 grams of dried skimmed milk, and in which said diet includes sufficient additional fat, oil or other source of essential fatty acids to supply the patient with his minimum fatty acid requirements.

18. A method for treating obesity in which an individual ingests a daily diet having a total calorie content of not greater than 600 Kcals and consisting essentially of skimmed milk and a supplement according to claim 1 in an amount equivalent to 18 mg ±9 mg of iron, said skimmed milk being given in an amount equivalent to from 61.3 to 123 grams of dried skimmed milk, and wherein said individual ingests sufficient additional fat, oil or other source of essential fatty acids to supply the individual with his minimum fatty acid requirements.

19. A method for treating obesity in which an individual ingests a daily diet having a total calorie content of not greater than 600 Kcals and consisting essentially of skimmed milk and a supplement according to claim 9 in an amount equivalent to about 18 mg of iron, said skimmed milk being given in an amount equivalent to from 61.3 to 123 grams of dried skimmed milk, and wherein said individual ingests sufficient additional fat, oil or other source of essential fatty acids to supply the individual with his minimum fatty acid requirements.

20. In a method for treating obesity in which an individual ingests a daily diet consisting essentially of:

(A) at least the minimum daily requirements of all the minerals required by man;
(B) proteinaceous material selected from at least one member of the class consisting of:
  (i) a mixture of monomeric L-aminoacids, and
  (ii) natural proteins, and
  (iii) natural proteins reinforced with at least one monomeric L-aminoacid; and
(C) digestible carbohydrate;
said method being characterized: in that the amount of proteinaceous material ingested daily is at least 15 g and contains at least the minimum daily requirements for man of all the essential L-aminoacids required by man; in that the amount of carbohydrate ingested daily is from 15 to 75 g; in that the total caloric value of the daily diet is no greater than 600 Kcals; and in that the ratio of weight of the proteinaceous material to the digestible carbohydrate in the daily diet is in the range of from 1:1 to 1:5; the improvement comprising ingesting a daily diet consisting essentially of skimmed milk in an amount equivalent to 61.3 to 123 grams of dried skimmed milk and a supplement according to claim 1 in an amount equivalent to 18 mg ±9 mg of iron.

21. In a method for treating obesity in which an individual ingests a daily diet consisting essentially of:
(A) at least the minimum daily requirement of all the minerals required by man;
(B) proteinaceous material selected from at least one member of the class consisting of:
  (i) a mixture of monomeric L-aminoacids, and
  (ii) natural proteins, and
  (iii) natural proteins reinforced with at least one monomeric L-aminoacid, and
(C) digestible carbohydrate;
said method being characterized in that the amount of proteinaceous material ingested daily is at least 15 g and contains at least the minimum daily requirements for man of all the essential L-aminoacids required by man; in that the amount of carbohydrate ingested daily is from 15 to 75 g; in that the total caloric value of the daily diet is no greater than 600 Kcals; and in that the ratio of weight of the proteinaceous material to the digestible carbohydrate in the daily diet is in the range of from 1:1 to 1:5; the improvement comprising ingesting a daily diet consisting essentially of skimmed milk in an amount equivalent to 61.3 to 123 grams of dried skimmed milk and a supplement according to claim 9 in an amount equivalent to about 18 mg of iron.

22. A method according to claim 17 wherein said skimmed milk and said supplement is given to said patient in the form of a mixture thereof.

23. A method according to claim 18 wherein said individual ingests a mixture of said skimmed milk and said supplement.

24. A method according to claim 19 wherein said individual ingests a mixture of said skimmed milk and said supplement.

25. A method according to claim 20 wherein said individual ingests a mixture of said skimmed milk and said supplement.

26. A method according to claim 21 wherein said individual ingests a mixture of said skimmed milk and said supplement.

27. A dietary composition consisting essentially of a mixture of skimmed milk and the dietary supplement of claim 1, the proportions of ingredients comprising the mixture being such that an amount of the mixture which contains the equivalent of 61.3 to 123 g of dried skimmed milk contains said dietary supplement in an amount equivalent to 18 mg ±9 mg of iron.

28. A dietary composition consisting essentially of a mixture of skimmed milk and the dietary supplement of claim 9, the proportions of ingredients comprising the mixture being such that an amount of the mixture which contains the equivalent of 61.3 to 123 g of dried skimmed milk contains said dietary supplement in an amount equivalent to about 18 mg of iron.

29. In a dietary composition for the treatment of obesity in man consisting essentially of:
(A) at least the minimum daily requirements of all the minerals required by man;
(B) proteinaceous material selected from at least one member of the class consisting of:
  (i) a mixture of monomeric L-aminoacids, and
  (ii) natural proteins, and
  (iii) natural proteins reinforced with at least one monomeric L-aminoacid; and
(C) digestible carbohydrate; and
characterized in that the smallest amount of the dietary formulation containing at least the minimum daily requirements of each of the minerals required by man also contains:
  (a) at least 15 g of said proteinaceous material which must include at least the minimum daily requirements for man of all the essential L-aminoacids required by man; and
  (b) from 15 to 75 g of said carbohydrate;
and further characterized in that the total caloric value of the smallest amount of the dietary formulation is no greater than 600 Kcals and in that the ratio by weight of the proteinaceous materials to the digestible carbohydrate is in the range of 1:1 to 1:5; the improvement comprising said composition consisting essentially of a mixture of skimmed milk and the dietary supplement of claim 1, the proportions of ingredients comprising the mixture being such that an amount of the mixture which contains the equivalent of 61.3 to 123 g of dried skimmed milk contains said dietary supplement in an amount equivalent to 18 mg ±9 mg of iron.

30. In a dietary composition for the treatment of obesity in man consisting essentially of:
(A) at least the minimum daily requirement of all the minerals required by man;
(B) proteinaceous material selected from at least one member of the class consisting of:
  (i) a mixture of monomeric L-aminoacids, and
  (ii) natural proteins, and
  (iii) natural proteins reinforced with at least one monomeric L-aminoacid; and
(C) digestible carbohydrate; and
characterized in that the smallest amount of the dietary formulation containing at least the minimum daily requirements of each of the minerals required by man also contains:
  (a) at least 15 g of said proteinaceous material which must include at least the minimum daily requirement for man of all the essential L-aminoacids required by man; and
  (b) from 15 to 75 g of said carbohydrate;
and further characterized in that the total caloric value of the smallest amount of the dietary formulation is no greater than 600 K cals and in that the ratio by weight of the proteinaceous materials to the digestible carbohydrate is in the range of 1:1 to 1:5; the improvement comprising said composition consisting essentially of a mixture of skimmed milk and the dietary supplement of claim 9, the proportions of ingredients comprising the mixture being such that an amount of the mixture which contains the equivalent of 61.3 to 123 g of dried skimmed milk contains said dietary supplement in an amount equivalent to about 18 mg of iron.

* * * * *

UNITED STATES PATENT AND TRADEMARK OFFICE
CERTIFICATE OF CORRECTION

PATENT NO. : 4,237,118
DATED : December 2, 1980
INVENTOR(S) : Alan N. Howard

It is certified that error appears in the above—identified patent and that said Letters Patent is hereby corrected as shown below:

Title page, Abstract, line 17 - "phosporus" should read --phosphorus--.

Title page, Abstract, line 22 - "p-aminoenzoic" should read --p-aminobenzoic--.

Column 2, lines 35-36 - "considerble" should read --considerable--.

Column 3, line 32 - "alreadyavailable" should read --already-available--.

Column 4, line 8 - "considerble" should read --considerable--.

Column 6, line 55 - after "chlorides" insert a comma --,--.

Column 10, line 46 - "along" should read --alone--.

Column 10, line 58 - "resepective" should read --respective--.

Column 11, line 49 - "10,000" should read --1,000--.

Column 15, Claim 6, line 3 - "phoshorus" should read --phosphorus--.

Signed and Sealed this

Third Day of March 1981

[SEAL]

Attest:

RENE D. TEGTMEYER

Attesting Officer

Acting Commissioner of Patents and Trademarks